United States Patent
Weisz et al.

(10) Patent No.: US 12,322,388 B2
(45) Date of Patent: Jun. 3, 2025

(54) CORRECTING SPEECH RECOGNITION ERRORS BY CONSIDERING PRIOR USER EDITS AND/OR ASSESSING FULFILLMENT DATA

(71) Applicant: Google LLC, Mountain View, CA (US)

(72) Inventors: Ágoston Weisz, Zurich (CH); Miroslaw Michalski, Pfaffikon SZ (CH); Aurélien Boffy, Basel (CH)

(73) Assignee: GOOGLE LLC, Mountain View, CA (US)

( * ) Notice: Subject to any disclaimer, the term of this patent is extended or adjusted under 35 U.S.C. 154(b) by 449 days.

(21) Appl. No.: 17/842,166

(22) Filed: Jun. 16, 2022

(65) Prior Publication Data

US 2023/0402034 A1 Dec. 14, 2023

Related U.S. Application Data

(60) Provisional application No. 63/351,664, filed on Jun. 13, 2022.

(51) Int. Cl.
| | | |
|---|---|---|
| *G10L 15/22* | (2006.01) | |
| *G10L 15/06* | (2013.01) | |
| *G10L 15/18* | (2013.01) | |

(52) U.S. Cl.
CPC ............ *G10L 15/22* (2013.01); *G10L 15/063* (2013.01); *G10L 15/1815* (2013.01); *G10L 2015/223* (2013.01)

(58) Field of Classification Search
CPC ..... G10L 15/22; G10L 15/01; G10L 15/1815; G10L 2015/223
See application file for complete search history.

(56) References Cited

U.S. PATENT DOCUMENTS

| | | | |
|---|---|---|---|
| 9,418,177 B1* | 8/2016 | Lloyd | G10L 15/26 |
| 2007/0073540 A1* | 3/2007 | Hirakawa | G10L 15/22 |
| | | | 704/E15.04 |
| 2013/0179166 A1* | 7/2013 | Fujibayashi | G10L 15/22 |
| | | | 704/235 |
| 2015/0046435 A1 | 2/2015 | Donneau-Golencer | |
| 2018/0081989 A1 | 3/2018 | Nakao et al. | |
| 2018/0096678 A1* | 4/2018 | Zhou | G10L 15/08 |
| 2020/0243070 A1 | 7/2020 | Kapralova et al. | |

(Continued)

*Primary Examiner* — Samuel G Neway
(74) *Attorney, Agent, or Firm* — Gray Ice Higdon

(57) ABSTRACT

Implementations relate to correcting a speech recognition hypothesis based on prior correction(s) made by a user and/or fulfillment data associated with fulfilling a request embodied in the speech recognition hypothesis. A candidate speech recognition hypothesis can be generated in response to the user providing a spoken utterance to an application, such as an automated assistant. When a confidence metric for the candidate speech recognition hypothesis does not satisfy a threshold, one or more terms of the candidate speech recognition hypothesis can be compared to correcting data. The correcting data can indicate whether the user previously corrected any term(s) present in the candidate speech recognition hypothesis and, if so, correct the term(s) accordingly. Fulfillment data generated for the candidate hypothesis and/or for the corrected hypothesis can also be processed to determine whether to utilize the candidate hypothesis or the corrected hypothesis in responding to the user.

16 Claims, 8 Drawing Sheets

(56) References Cited

U.S. PATENT DOCUMENTS

| | | | |
|---|---|---|---|
| 2020/0380077 A1* | 12/2020 | Ge | G10L 15/18 |
| 2021/0012765 A1* | 1/2021 | Weisz | G10L 15/1815 |
| 2021/0142789 A1 | 5/2021 | Gurbani et al. | |
| 2022/0139373 A1* | 5/2022 | Weisz | G10L 15/01 |
| | | | 704/231 |
| 2023/0402034 A1* | 12/2023 | Weisz | G10L 15/22 |

* cited by examiner

CORRECTING SPEECH RECOGNITION ERRORS BY CONSIDERING PRIOR USER EDITS AND/OR ASSESSING FULFILLMENT DATA

BACKGROUND

Humans can engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") can provide commands and/or requests using spoken natural language input (i.e., utterances) which can be converted into text and then processed, and/or by providing textual (e.g., a typed input) natural language input.

Various automatic speech recognition techniques have been proposed for processing audio data, that includes a spoken utterance, to generate text that is predicted to correspond to the spoken utterance. As referenced above, the generated text can then be utilized by an automated assistant in responding to the spoken utterance by e.g., performing action(s) that correspond to a request of the spoken utterance.

Although accuracy of automatic speech recognition has improved over the years, complexities of spoken languages and/or variations in speech among users still results in misrecognitions. For example, certain speech characteristics of a user can cause a speech recognition process, used by an automated assistant, to consistently misrecognize certain words, phrases, and/or phonemes for that user. As a result, during an interaction between a user and an automated assistant the user may have to repeatedly speak a phrase before it is accurately recognized by the speech recognition process, which can prolong the interaction between the automated assistant and the user and/or can result in the automated assistant errantly attempting to respond to prior misrecognition(s) of the phrase. Further, the user may even have to resort to utilizing a higher latency keyboard interface (e.g., virtual keyboard interface) to manually type the phrase to have it accurately processed by the automated assistant.

SUMMARY

Implementations set forth herein relate to generating an alternate speech recognition hypothesis by replacing particular term(s), of a speech recognition hypothesis generated by performing automatic speech recognition (ASR) on audio data capturing a spoken utterance, with alternate term(s). The alternate term(s) can be used to replace the particular term(s) based on correction data, for a user providing the spoken utterance and/or for a client device capturing the audio data, indicating that in prior interaction(s) (of the user and/or at the client device) the alternate term(s) were determined to be used as a correction to the particular term(s) in a prior ASR recognition.

In some implementations, the alternate speech recognition hypothesis will only be generated responsive to determining that one or more metrics, for the speech recognition hypothesis generated by performing ASR, satisfy a misrecognition threshold that indicates that the speech recognition hypothesis may include misrecognized term(s). Put another way, in those implementations, an alternate speech recognition hypothesis, that replaces a particular term of a speech recognition hypothesis with an alternate term, will only be generated in response to determining that the speech recognition hypothesis likely includes misrecognized term(s). Various metric(s) can be utilized, such as those based on ASR confidence score(s) that reflect ASR confidence in all or parts of the speech recognition hypothesis, those based on past queries from the user and/or the client device (e.g., based on whether the speech recognition hypothesis has been issued in the past), those based on entropy of ASR confidence scores for the speech recognition hypothesis and other speech recognition hypotheses generated by performing the ASR, those based on fulfillment data for the speech recognition hypothesis, etc. In these and other manners, computational resources are conserved by only selectively generating the alternate speech recognition hypothesis and performing subsequent analysis of the alternate speech recognition hypothesis.

In some implementations, the metric(s) for a hypothesis are processed, using a machine learning model, to generate output (e.g., a probability or other measure) that indicates a prediction as to whether the hypothesis is a misrecognition. In those implementations, determining whether the hypothesis is a misrecognition can be based on whether the output satisfies a threshold. Such a model can be trained based on supervised or semi-supervised training examples that each include input feature(s) that include metric(s) for a corresponding hypothesis, and a labeled output that indicates whether the hypothesis was a misrecognition (e.g., "0" if not, "1" if so). For example, a human reviewer can apply the label for supervised examples. As another example, semi-supervised examples can be generated based on user input(s), for a hypothesis, that indicate (explicitly or implicitly) whether the hypothesis is correct. For instance, a prior interaction that is determined to be a correction to a hypothesis (see e.g., discussion below) can be used to generate a label, for the hypothesis, that indicates the hypothesis is not correct.

When the alternate speech recognition hypothesis is generated, various techniques can be utilized in determining whether to utilize the alternate speech recognition hypothesis, or the speech recognition hypothesis, in responding to the spoken utterance of the user (e.g., in performing assistant action(s) that correspond to the utilized hypothesis). In some implementations, those various techniques include considering hypothesis fulfillment data for the speech recognition hypothesis and considering alternate fulfillment data for the alternate speech recognition hypothesis. For example, the alternate speech recognition hypothesis can be utilized if the hypothesis fulfillment data indicates that automated assistant action(s) cannot be performed based on the speech recognition hypothesis and the alternate fulfillment data indicates that automated assistant action(s) can be performed based on the alternate speech recognition hypothesis. As another example, the alternate speech recognition hypothesis can be utilized if the hypothesis fulfillment data indicates a first degree of confidence in corresponding automated assistant action(s) that would be performed based on the speech recognition hypothesis and the alternate fulfillment data indicates a second degree of confidence, in corresponding automated assistant action(s) that would be performed based on the alternate speech recognition hypothesis—and that second degree of confidence indicates greater confidence than (or at least a threshold degree greater than) the first degree of confidence.

Optionally, in the immediately preceding example, the alternate speech recognition hypothesis will only be utilized if the second degree of confidence is at least a threshold degree greater than the first degree of confidence. This can bias the determination toward the speech recognition hypothesis to prevent erroneous occurrences of replacing particular term(s) with alternate term(s), while still enabling replacement in situations where fulfillment data indicates the alternate term(s) were likely intended by the spoken utterance. Various techniques can consider other factor(s), in addition to or instead of fulfillment data, such as metric(s) based on ASR confidence score(s), based on past queries from the user and/or the client device, based on entropy of ASR confidence scores for the speech recognition hypothesis and other speech recognition hypotheses generated by performing the ASR, etc.

Moreover, various techniques can optionally process fulfillment data and/or other factor(s) for a given hypothesis, using a machine learning model (e.g., a boosted random forest described herein), to generate output that reflects whether that hypothesis should be utilized. Output can be generated for each of multiple hypotheses, by processing corresponding data for the hypothesis using the machine learning model, and the outputs for the multiple hypothesis can be compared in determining which to utilize. For example, it can be determined to utilize the hypothesis whose output most indicates being a correct recognition of the spoken utterance. In some implementations, the machine learning model utilized in generating output that reflects whether a hypothesis should be utilized can be the same as the machine learning model (e.g., described above) that is utilized in determining whether a hypothesis is a misrecognition. For example, metric(s) and/or other input feature(s) can be processed, using the machine learning model, to generate output that indicates whether the hypothesis is a misrecognition (e.g., values close to "0" indicate less likely a misrecognition, values closer to "1" indicate more likely a misrecognition).

As a working example for use in describing some implementations, assume that in a prior interaction a user provided a prior spoken utterance of "text Behshad" and that in a prior ASR recognition of the prior spoken utterance a primary hypothesis was determined to be "text best shot". Further assume that the user provided one or more input(s) and that the input(s) were determined to indicate, directly or indirectly, that "best shot" should have actually been recognized as "Behshad". In response to those input(s) being determined to indicate that "best shot" should have actually been recognized as "Behshad", a correction data instance can be stored, in association with a user account of the user (with prior permission from the user), that indicates "Behshad" should at least selectively be utilized as a correcting term for occurrences of "best shot" in ASR hypotheses. Optionally, the correction data instance will be cleared from being stored in association with the user account if it is not used in generating any alternate recognition hypothesis (at all, or any that is actually selected for utilization) within a threshold duration of time (e.g., 30 days or other threshold). In these and other manners, memory and/or other resource(s) will not be utilized in continuing to store correction data instances that may no longer be useful due to, for instance, an updated ASR model that no longer causes, in ASR processing, the misrecognition that is pertinent to the misrecognition instance.

Continuing with the working example and as one particular example of determining to store a correction data instance, if a transcript of "text best shot" was displayed and the user interacted with the transcript to delete "best shot" and replace it with "Behshad" through typing—that interaction can be determined to indicate that "best shot" should have actually been recognized as "Behshad". For instance, the determination can be based on the user deleting "best shot" and replacing it with "Behshad", based on "best shot" and "Behshad" having at least a threshold degree of phonetic similarity, and/or based on ASR confidence in "best shot" being relatively low. As another particular example, if a user manually typed "text Behshad" within a threshold amount of time after providing the spoken utterance, that interaction can be determined to indicate that "best shot" should have actually been recognized as "Behshad". For instance, the determination can be based on the user typing "Behshad" within a threshold amount of time of the spoken utterance, based on "best shot" and "Behshad" having at least a threshold degree of phonetic similarity, based on ASR confidence in "best shot" being relatively low. Additional or alternative techniques for generating correction data can be utilized.

Continuing with the working example, assume that after storing the correction instance, that indicates "best shot" should be at least selectively corrected to "Behshad", the user provides a spoken utterance of "call Behshad". Further, assume a primary hypothesis, from ASR processing of audio data that captures that spoken utterance, is determined to be "call best shot". Based on the spoken utterance being from the user and/or the client device, and the correction data instance being stored in association with the user and/or the client device, the correction data instance can be used to generate an alternate speech recognition hypothesis of "call Behshad". In implementations where the correction data instance is stored in association with an account of the user, the correction data instance can be used based on determining that the spoken utterance is from the user associated with the account. Determining that the spoken utterance is from the user associated with the account can be based on, for example, performing speaker recognition based on the spoken utterance (e.g., text-independent speaker recognition) and/or performing speaker recognition on a wake word that preceded the spoken utterance (e.g., text-dependent speaker recognition). Additional or alternative techniques can be utilized, such as facial recognition when the client device includes camera(s).

As referenced above, in some implementations the correction data instance is used to generate the alternate speech recognition hypothesis in response to determining that one or more metrics, for the speech recognition hypothesis generated by performing ASR, satisfy a misrecognition threshold that indicates that the speech recognition hypothesis may include misrecognized term(s). For example, the alternate speech recognition hypothesis can be generated based on an ASR confidence score indicating low confidence in "best shot" and/or there being high entropy in the ASR confidence scores for "best shot" and other ASR hypotheses for the corresponding part of the spoken utterance (e.g., other hypotheses such as "best hot", "bees shot", etc.). As another example, the alternate speech recognition hypothesis can be generated based on a language model score indicating "call best shot" has a low likelihood of occurrence and/or based on historical data for the user indicating no or rare occurrences of "best shot" or "call best shot" in past inputs of the user.

When the alternate speech recognition hypothesis of "call Behshad" is generated, various techniques can be utilized in determining whether to utilize "call Behshad" or to instead utilize the primary ASR hypothesis of "call best shot" and/or other ASR hypothesis/hypotheses. In some implementations, first fulfillment data for "call best shot" and second fulfillment data for "call Behshad" can be utilized. Fulfillment data for a hypothesis can indicate a responsiveness of the automated assistant and/or other application to the hypothesis. For example, the fulfillment data for a hypothesis can indicate whether the automated assistant and/or other application is able to perform action(s) based on the hypothesis (e.g., it can be a binary "capable" or "not capable"). For instance, for "call best shot", if the automated assistant (or a phone application interacting with the automated assistant) determines there is not a contact (e.g., a contact of the user and/or a local business contact) that has an alias of "best shot", the first fulfillment data can indicate that the automated assistant is unable to perform any action based on "call best shot". On the other hand, for "call Behshad", if the automated assistant (or the phone application) determines there is a contact with the alias "Behshad", the second fulfillment data can indicate that the automated assistant is able to perform, via interaction with the phone application, an action based on "call Behshad". Based at least in part on such first and second fulfillment data, "call Behshad" can be selected as the correct hypothesis and the action corresponding to "call Behshad" performed in response to the spoken utterance". For instance, "call Behshad" can be selected since the first fulfillment data indicates the automated assistant is able to perform an action based on "call Behshad", while the second fulfillment data indicates the automated assistant is unable to perform an action based on "call Behshad". Utilization of fulfillment data in these and other manners can prevent erroneous utilizations of "Behshad" to correct "best shot". For example, if the utterance were instead "play hit me with your best shot", first fulfillment data from a music streaming application can indicate ability to play a corresponding song for an ASR hypothesis of "play hit me with your best shot", whereas second fulfillment data from the music streaming application can indicate inability to play a corresponding song for an alternate hypothesis of "play hit me with your Behshad". Accordingly, in such a situation the alternate hypothesis can be prevented from being utilized in a failed attempt to play a non-existent song of "hit me with your Behshad". In situations where the first fulfillment data and the second fulfillment data both indicate capability, the ASR hypothesis can optionally be utilized in view of the above referenced desire to bias toward the ASR hypothesis in some implementations.

As another example, the fulfillment data for a transcription can additionally or alternatively indicate a degree of confidence that the action(s) initiated by the fulfillment data are indeed correct or intended action(s) of the automated assistant and/or other application. For instance, for "call best shot", if the automated assistant (or a phone application interacting with the automated assistant) determines there is a local business contact of "Best Shot Golf Store" that partially matches "best shot", but the user has never called that local business contact, the first fulfillment data can include a value of 0.4, where values closer to 0.0 indicate lesser confidence and values closer to 1.0 indicate greater confidence. In this instance, the value of 0.4 can be closer to 0.0 as a result of the contact being a local business contact instead of a personal contact, the user having never called that local business contact, and/or the match between the local business contact and "best shot" being only a partial match (i.e., "golf store" was not also included in the hypothesis). On the other hand, for "call Behshad", if the automated assistant (or the phone application) determines there is a personal contact with the alias "Behshad", and that the user frequently calls that contact, the second fulfillment data can include a value of 0.9. In this instance, the value of 0.9 can be closer to 1.0 as a result of the contact being a personal contact and/or based on a frequency of interaction of the user with the contact. Based at least in part on such first and second fulfillment data, "call Behshad" can be selected as the correct hypothesis and the action corresponding to "call Behshad" performed in response to the spoken utterance". As referenced above, in some implementations a bias toward an ASR hypothesis and/or away from the alternate hypothesis can be utilized. For example, a boost can be applied to the value of 0.4 (e.g., a 20% boost), a reduction can be applied to the value of 0.9, and/or the value for the alternate hypothesis can have to exceed the value for the ASR hypothesis by a threshold amount (e.g., 0.15). Application of such biasing can prevent erroneous utilizations of "Behshad" to correct "best shot". For instance, if the automated assistant (or a phone application interacting with the automated assistant) had instead determined there is a local business contact of "Best Shot" that fully matches "best shot", and the user has recently called that local business contact, the first fulfillment data can include a value of 0.8. Although 0.8 is still less than 0.9, determined for the alternate hypothesis, biasing can be used to nonetheless select the ASR hypothesis for utilization.

As another example of implementations disclosed herein, audio data characterizing a spoken utterance can be processed to generate a speech recognition hypothesis. The speech recognition hypothesis can embody one or more hypothesis terms (e.g., a hypothesis of "Call Mom" may be considered to have two hypothesis terms), and can be utilized to identify one or more operations/intents and/or parameters (e.g., a "call( )" operation and a parameter or slot value "Mom") capable of being executed by the automated assistant. In some implementations, when a suitable operation and/or parameter is not identified, and/or not identified with a threshold degree of confidence, for a particular speech recognition hypothesis, the speech recognition hypothesis, another speech recognition hypothesis, and/or corresponding audio data, can undergo further processing. For example, an operation that is identified based on a speech recognition hypothesis may not be suitable and/or be associated with a threshold degree of confidence because of a context of the user. Alternatively, or additionally, an operation may not be identified with a threshold degree of confidence because of data indicating that the automated assistant and/or other application cannot suitably perform the operation.

For example, when a user is driving to a family gathering and provides a spoken utterance such as, "Call Mom," a speech recognition hypothesis can be generated as, "Call Tom," which can be inaccurate relative to the original spoken utterance. In some implementations, the automated assistant can determine that this speech recognition hypothesis is incorrect using contextual data (e.g., calendar data, call history data, etc.), with prior permission from the user, that indicates the user is driving to a family gathering and hasn't contacted their contact "Tom" in over a couple years. Alternatively, or additionally, the automated assistant can determine that this speech recognition hypothesis is incorrect using a misrecognition model, which can be trained based on prior instances in which the user corrected a prior transcription of "Tom" to be "Mom." For example, such prior instances can occur during previous interactions between the user and the automated assistant (e.g., when sending a text message via the automated assistant), and/or the user and another application (e.g., when transcribing from voice to text via an email application).

When the speech recognition hypothesis is determined to be incorrect, or is otherwise not generated with a threshold degree of confidence, the automated assistant (or other speech processing module and/or application) can determine whether a hypothesis term is associated with a correcting term, based on certain data. In some implementations, this replacement can occur using data generated during the prior interactions, and/or using one or more trained machine learning models. For example, a random forest technique can be utilized when processing the spoken utterance and/or a speech recognition hypothesis to identify a separate speech recognition hypothesis. In some implementations, a boosted random forest model can be utilized when processing the spoken utterance and/or speech recognition hypothesis to identify a separate speech recognition hypothesis. The boosted random forest (BRF) model can, during training, sequentially create decision tree classifiers that complement each other. During such training, sampled training data and/or certain "leafs" of certain trees can be weighted according to classification errors identified during training. For example, training data (e.g., $y_i$, $x_i$, where i=1, . . . , N), can include certain natural language terms ($x_i$) and any corresponding corrected terms ($y_i$) that a user may have provided, via a correcting input, to correct prior inputs to an application(s) (e.g., the automated assistant). Alternatively, or additionally, training data can include certain natural language terms ($x_i$) for various inputs, and an indication ($y_i$) of whether each term has been misinterpreted by the automated assistant.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
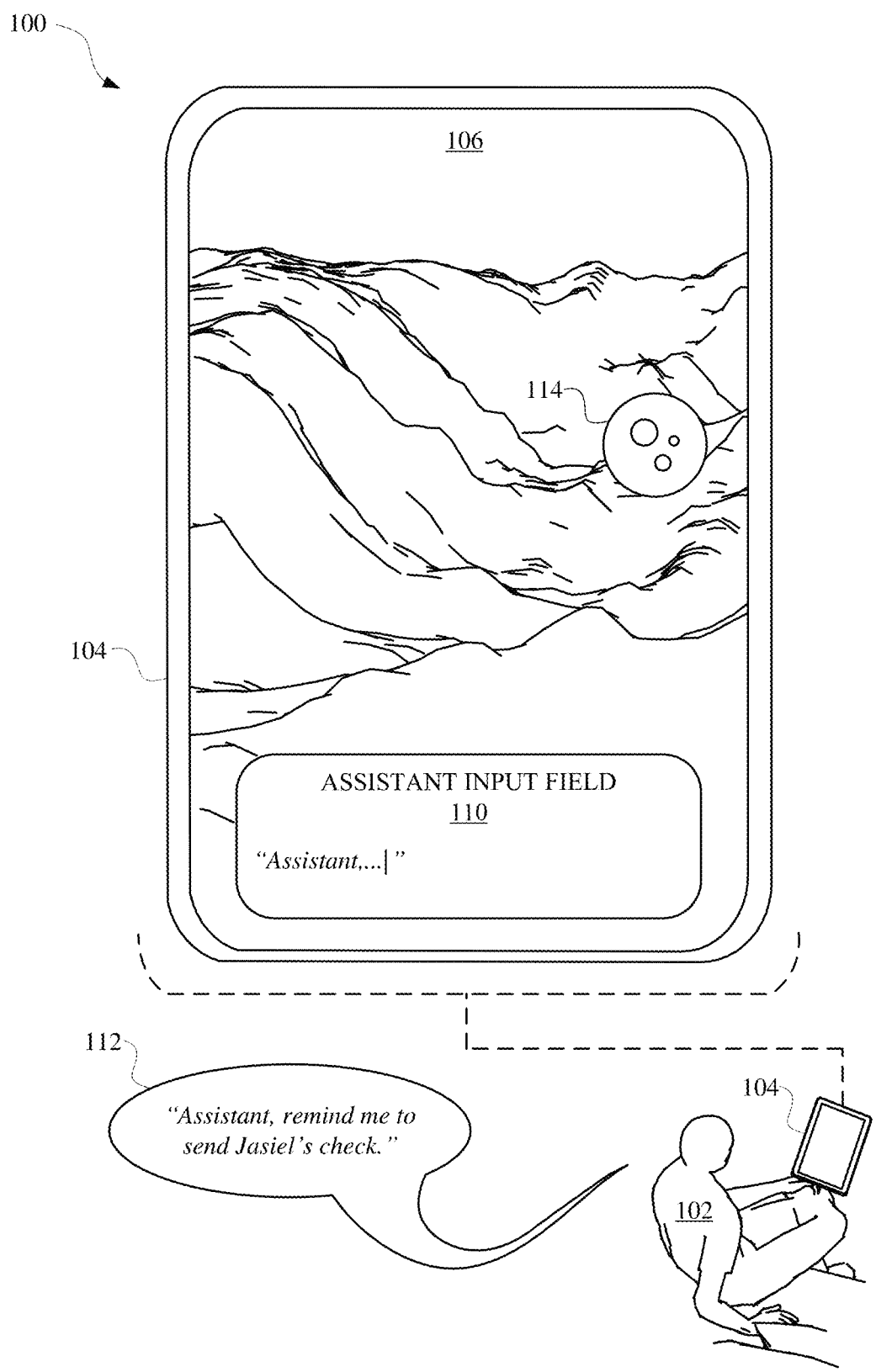
FIG. 1A, FIG. 1B, FIG. 1C, and FIG. 1D illustrate views of a user interacting with an application that can rewrite speech recognition hypotheses based on prior user edits and/or assistant fulfillment data.
Figure 1B:
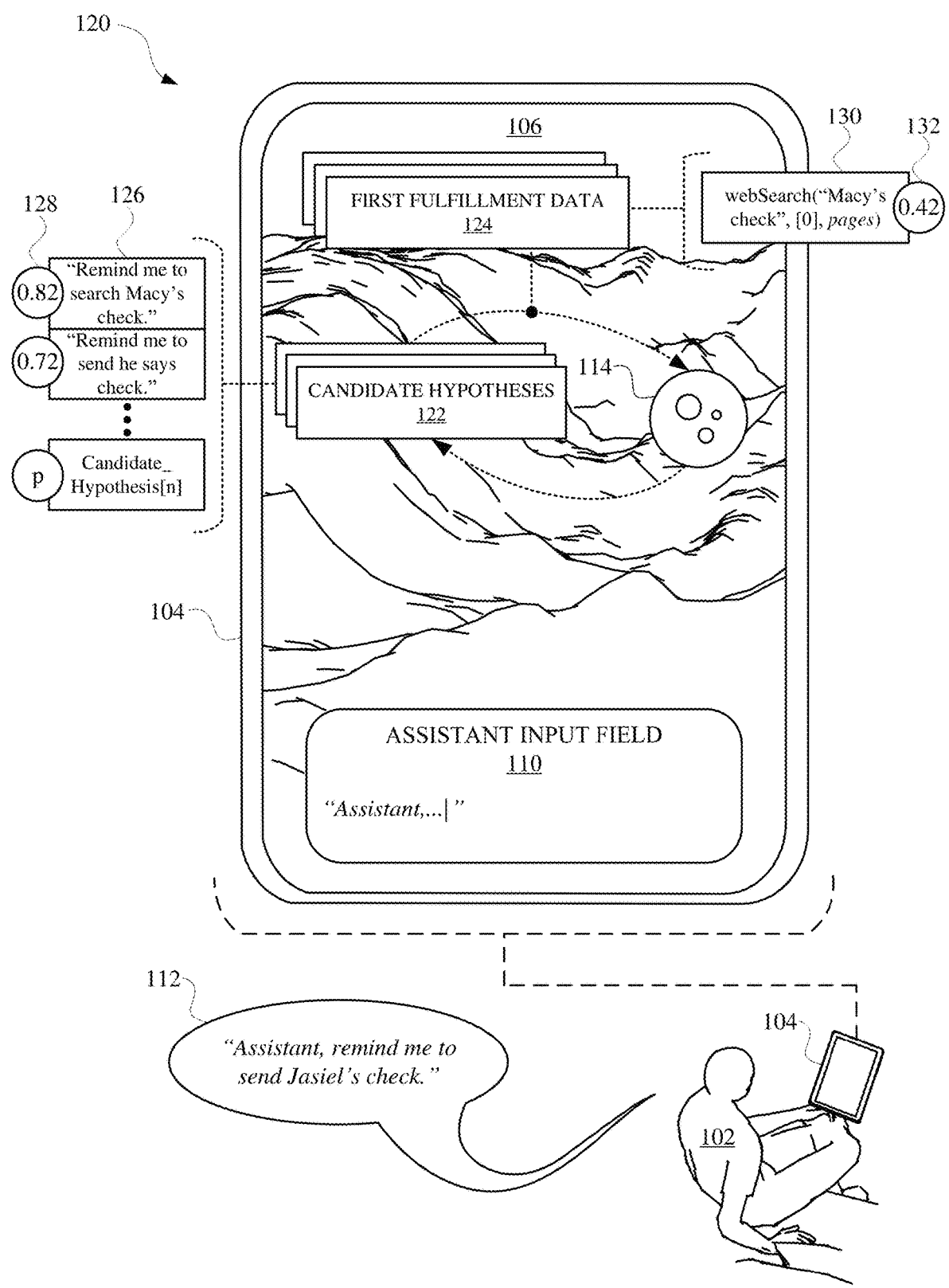
Figure 1C:
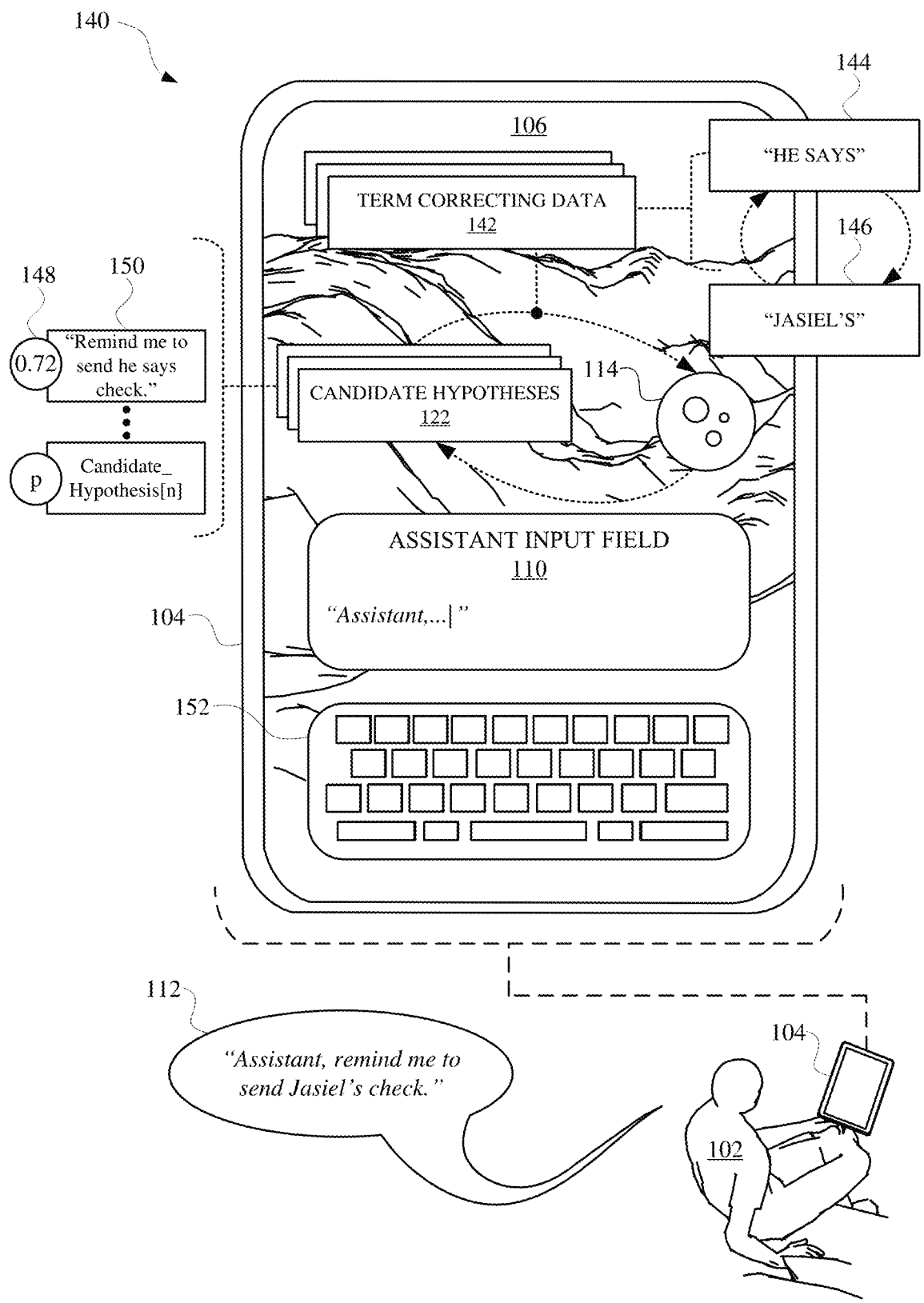
Figure 1D:
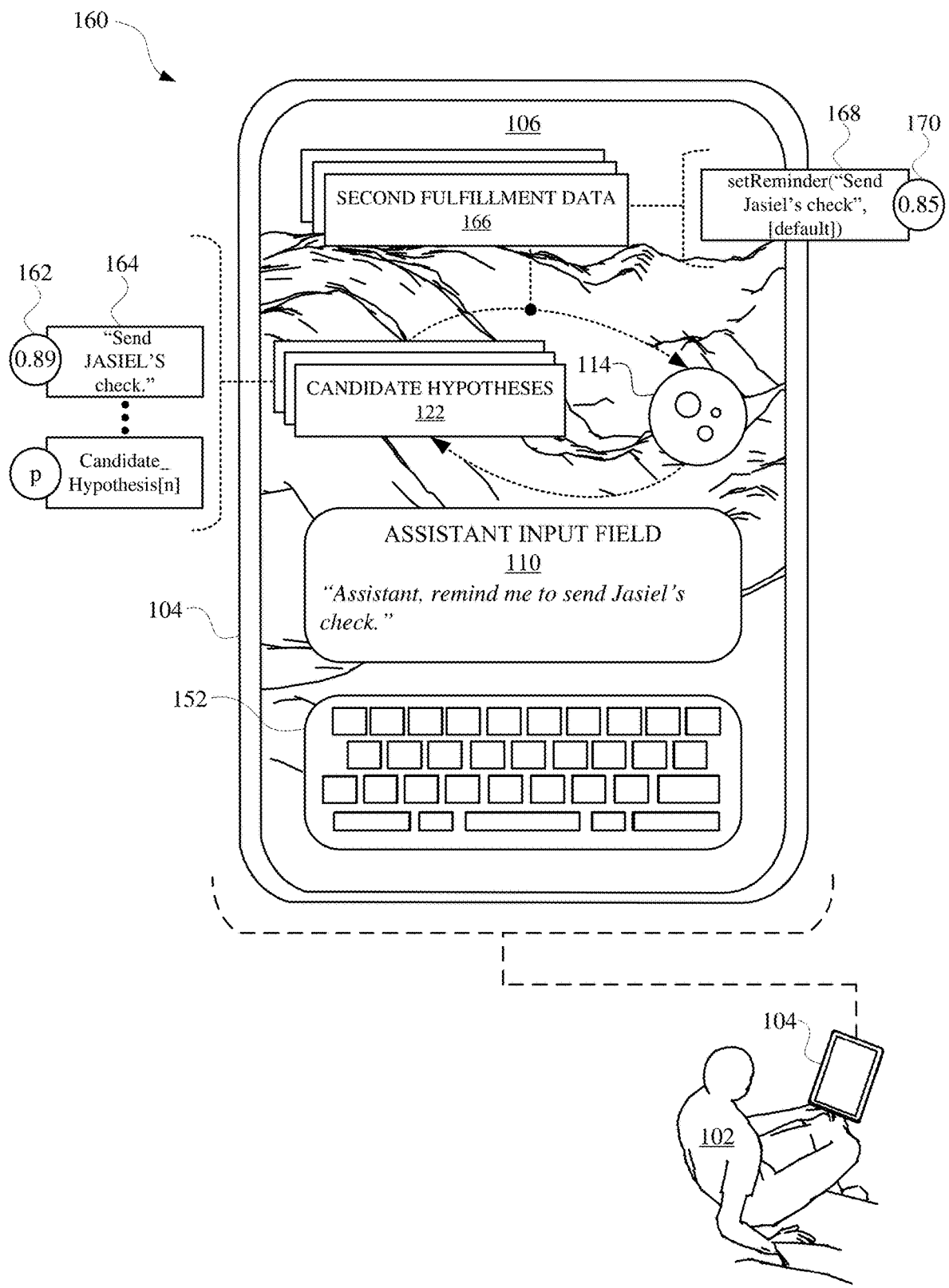

FIG. 1A, FIG. 1B, FIG. 1C, and FIG. 1D illustrate a view 100, a view 120, a view 140, and a view 160 of a user 102 interacting with an application that can rewrite speech recognition hypotheses based on prior user edits and/or assistant fulfillment data. For example, the user 102 can provide a spoken utterance 112 to an application, such as an automated assistant, which can be represented by a selectable element 114 when initialized (e.g., when an invocation phrase or other user input is detected). The user 102 can provide a spoken utterance 112 to the automated assistant to cause the automated assistant to fulfill a request embodied in the spoken utterance. However, depending on the spoken utterance, speech processing of audio data of the spoken utterance may not result in an accurate representation of the spoken utterance. In some implementations, any resulting representation can be edited based on prior user-editing of a transcription and/or other data that may be relevant to the spoken utterance and/or transcription.

For example, the user 102 can provide a spoken utterance 112 such as, "Assistant, remind me to send Jasiel's check," which can refer to a request for the automated assistant to set a calendar reminder regarding a particular task the user 102 wants to be reminded about. In response to the automated assistant receiving the spoken utterance 112, the automated assistant can cause an assistant input field 110 to be rendered at a display interface 106 of the computing device 104. In some implementations, the assistant input field 110 can be rendered with natural language content that is progressively edited as the user 102 speaks and/or thereafter. For example, the assistant input field 110 can include the word "Assistant . . . " as illustrated in FIG. 1A to indicate that the automated assistant has received at least a portion of the spoken utterance 112 but is still determining a suitable hypothesis to present for the remaining portion of the spoken utterance 112.

In some implementations, the automated assistant and/or other application or module can determine candidate hypotheses 122 for the spoken utterance 112. Each candidate hypothesis (e.g., a first hypothesis 126) can be assigned a confidence metric (e.g., a first metric 128) that can indicate a degree of confidence that the candidate hypothesis describes the spoken utterance 112. In some implementations, each candidate hypothesis can be generated using ASR and each confidence metric can be generated based on a degree to which the ASR process and/or other module is confident that a respective candidate describes the spoken utterance 112. When a particular confidence metric satisfies a threshold and/or otherwise represents a candidate hypothesis with the greatest confidence, the corresponding candidate hypothesis (e.g., the first hypothesis 126) can be selected for further processing. In some implementations, a confidence metric can be based on a confidence metric for previous spoken utterances submitted by the user within a duration of time. Alternatively, or additionally, the confidence metric can be based on an entropy of all hypotheses created for the spoken utterance. Alternatively, or additionally, the confidence metric can be based on a time of day that the user provided the spoken utterance, one or more features of a location of the user when they provided the spoken utterance, a language of the spoken utterance, and/or a semantic location of the user when they provided the spoken utterance. In some implementations, the confidence score for a respective hypothesis can be based on a number of misrecognitions that have occurred for each term in the respective hypothesis.

For example, the first hypothesis 126 can be submitted to the automated assistant and/or automated assistant stack in furtherance of generating first fulfillment data 124. The first fulfillment data 124 can indicate a responsiveness of the automated assistant and/or other application by characterizing one or more intents, slot values, and/or other operational data that can be executed by the automated assistant and/or other application in response to processing the first hypothesis 126. For example, an intent of "webSearch," as well as a slot value "Macy's check," can be identified based on the first hypothesis 126. The fulfillment data 124 can be processed using one or heuristic processes and/or one or more trained machine learning models to determine whether executing the intent(s) is an accurate response given the candidate hypothesis and/or the context of the user 102. In some implementations, the first fulfillment data can be processed to determine a first hypothesis metric 132, which can be compared to a misrecognition threshold. When a hypothesis metric satisfies the misrecognition threshold, the corresponding candidate hypothesis can be considered a misrecognition, and another candidate hypothesis can be identified. For example, the first hypothesis metric 132 (0.42) can satisfy the misrecognition threshold (e.g., <0.5), and, in response, a second hypothesis 150 can be selected for further processing.

The second hypothesis 150 can be selected based on the second hypothesis 150 being assigned a second metric 148 that is ranked next, just under the first metric 128. In some implementations, processing a candidate hypothesis can include determining whether the candidate hypothesis includes one or more terms that the user 102 and/or another user has previously edited (e.g., via virtual keyboard 152) at a computing device. This determination can be performed when the second metric 148 satisfies an optional threshold (e.g., <0.8) for indicating that the candidate hypothesis may be at least partially inaccurate. When the second hypothesis 150 is determined to include one or more hypothesis terms that the user 102 has previously corrected using correcting inputs during prior interactions, the automated assistant and/or other application can process term correction data 142 to identify one or more correcting terms. For example, the user 102 may have previously provided a spoken utterance (e.g., " . . . Jasiel's . . . ") followed by an additional input to correct a written (incorrect) transcription "he says" to be "Jasiel's" during a prior interaction between the user 102 and an application. For example, the user 102 may have provided a different spoken utterance such as, "Hey, where are Jasiel's tools?" to a text message application to be transcribed. However, the resulting transcription may read, "Hey, where he says tools," which may have been corrected by a correcting input (e.g., to read "Hey, where are Jasiel's tools?") by the user 102 using the virtual keyboard 152 (or other keyboard interface for receiving manual user inputs), illustrated in FIG. 1C. This modification can be captured as hypothesis data that provides an association between the term(s) "he says" with the term(s) "Jasiel's."

When a corrected hypothesis 164 is created, the corrected hypothesis 164 can be optionally processed to determine a third metric 162 for the corrected hypothesis 164. When the third metric 162 is optionally determined to satisfy a confidence threshold (e.g., >0.5), the corrected hypothesis 164 can be processed to generate second fulfillment data 166. The second fulfillment data 166 can characterize one or more intents, slot values, and/or other operations that can be initialized for fulfilling a request embodied in the corrected hypothesis 164. For example, an intent 168 such as "setReminder( )" can be identified with a slot value "Send Jasiel's check" for fulfilling the request embodied in the corrected hypothesis 164. When a third hypothesis metric 170 for the intent 168 is determined to not satisfy the misrecognition threshold, the automated assistant can initialize performance of one or more operations (e.g., executing the intent(s)) in furtherance of fulfilling the request embodied in the corrected hypothesis 164.

In some implementations, the term correction data 142 can be stored for a duration of time until hypothesis term(s) (e.g., "he says") is no longer identified in candidate hypotheses that have corresponding confidence metrics that do not satisfy a particular threshold. Alternatively, or additionally, the term correction data 142 can be stored for a duration of time until the hypothesis term(s) (e.g., "he says") is no longer identified in any candidate hypothesis that has fulfillment data with a corresponding hypothesis metric that satisfies the misrecognition threshold. In other words, data characterizing hypothesis term and correcting term pairs can be stored until a model and/or heuristic process has been updated to ensure that misrecognitions do not involve certain hypothesis terms. In some implementations, the term correction data 142 can be stored in association with the contextual data. The contextual data can be generated based on one or more features of a context of one or more users (with prior permission from the one or more users) when the one or more users may have previously corrected the hypothesis term to be the correcting term. In some implementations, the contextual data can be processed using one or more heuristic processes and/or one or more trained machine learning models to determine whether to modify a speech recognition hypothesis in certain contexts. In some implementations, a feature such as location can weighted more or less depending on the hypothesis term to be corrected. For example, a user may correct certain hypothesis terms when traveling to a foreign country because they are attempting to practice a new language (new to the user) in the foreign country (e.g., the user traveling abroad may say "espresso" but the transcription presented is "express her"). However, the user may not correct those hypotheses terms when they are traveling domestically (e.g., the user traveling domestically may say "express her" and the hypothesis "express her" is not corrected to say "espresso" because the user is not traveling abroad), therefore adding the location as data to be processed with a hypothesis term and/or other data can eliminate false corrections.

Figure 2:
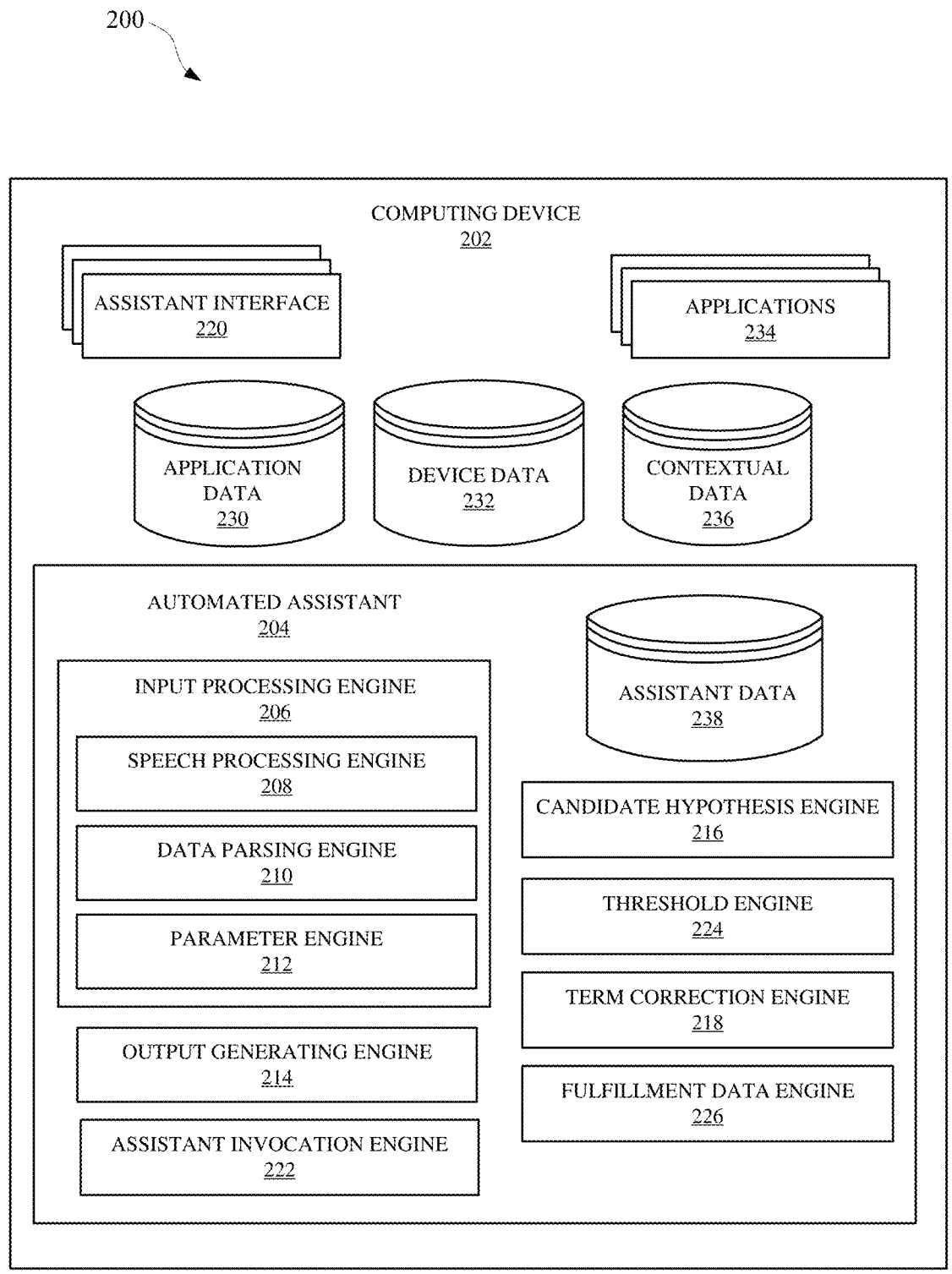
FIG. 2 illustrates a system for correcting speech recognition hypotheses based on prior corrections made by a user and/or fulfillment data associated with fulfilling a request embodied in a candidate speech recognition hypothesis.

FIG. 2 illustrates a system 200 for correcting speech recognition hypotheses based on prior corrections made by a user and/or fulfillment data associated with fulfilling a request embodied in a candidate speech recognition hypothesis. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the Internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can include a candidate hypothesis engine 216 that can utilize data from the input processing engine 206 to generate candidate speech recognition hypotheses for one or more applications 234 and/or the automated assistant 204. Each candidate hypothesis can include one or more natural language words and/or characters for describing a particular spoken utterance from a user. In some implementations, each candidate hypothesis for a particular spoken utterance can be further processed by the candidate hypothesis engine 216 to determine a metric for each respective candidate hypothesis. The metric can characterize a degree of confidence that a respective candidate hypothesis accurately describes the spoken utterance.

In some implementations, the system 200 can include a threshold engine 224 for determining one or more thresholds that can be utilized when responding to a spoken utterance from a user. The threshold engine 224 can also be utilized to determine whether a particular metric for a speech recognition process satisfies a particular threshold. For example, when a hypothesis metric for a particular candidate hypothesis does, or does not, satisfy a particular threshold, a term correction engine 218 can be invoked to determine whether the particular candidate hypothesis is associated with any correcting terms. In some implementations, term correcting data can be accessible to the system 200 and can indicate a correlation between a particular term and a correcting term. A correcting term can be stored in association with a hypothesis term when, for example, one or more users have edited a transcription of the hypothesis term to read as the correcting term (e.g., changing "Sarah" to "Zara"). When a particular term in a candidate speech recognition hypothesis is determined to include a term that has been previously corrected to read as a particular correcting term, the candidate hypothesis engine 216 can generate another candidate hypothesis that replaces, in the initial candidate hypothesis, the hypothesis term with the correcting term. As a result, a separate candidate hypothesis can be generated and further processed to determine whether to fulfill a request embodied in the separate candidate hypothesis.

In some implementations, replacement of a candidate hypothesis term with a correcting term can be determined based on contextual data 236, device data 232, application data 230, and/or assistant data 238 being processed by the candidate hypothesis engine 216, with prior permission from the user. For example, the candidate hypothesis engine 216 can determine, using contextual data 236, whether one or more features of a current context, in which the user provided a spoken utterance, are shared with one or more other features (e.g., a location of a computing device that received the spoken utterance, and/or any other features of a context) of a prior context in which the user corrected a transcription of a term of a candidate hypothesis for the spoken utterance. The contextual data 236, with term correcting data, can be processed to determine a degree of confidence that a particular correcting term should be utilized to replace a candidate hypothesis term. When the degree of confidence satisfies a particular threshold, as determined by the threshold engine 224, the candidate hypothesis term can be replaced with the correcting term.

In some implementations, the system 200 can include a fulfillment data engine 226 that can process one or more candidate hypotheses to determine fulfillment data for each respective candidate hypothesis. For example, the fulfillment data engine 226 can be utilized to process first hypothesis data corresponding to a candidate hypothesis, and second hypothesis data corresponding to a separate candidate hypothesis. The fulfillment data that is generated by the fulfillment data engine 226 can be further processed by one or more heuristic processes and/or one or more trained machine learning models (e.g., a boosted random forest model) to determine whether to fulfill a request embodied in the candidate hypothesis or the separate candidate hypothesis. In some implementations, the fulfillment data can identify intents, slot values, parameters, and/or other data that can be associated with a candidate hypothesis. Alternatively, or additionally, the fulfillment data can be processed in combination with contextual data (e.g., a username, location of a computing device, application name, temporal data, and/or any other data characterizing one or more features of a current and/or prior context) to determine whether to prioritize a particular candidate hypothesis over another candidate hypothesis. In some implementations, an output generated using a boosted random forest model can be compared to a threshold and/or other data to determine whether to initialize performance of one or more operations in furtherance of fulfilling the request embodied in the first hypothesis data or the second hypothesis data. In some implementations, a resulting output can indicate that a corrected candidate hypothesis should be prioritized for fulfilling over other candidate hypotheses. As a result, the automated assistant and/or other application can identify one or more operations to perform in furtherance of fulfilling the request embodied in the prioritized candidate hypothesis.

Figure 3A:
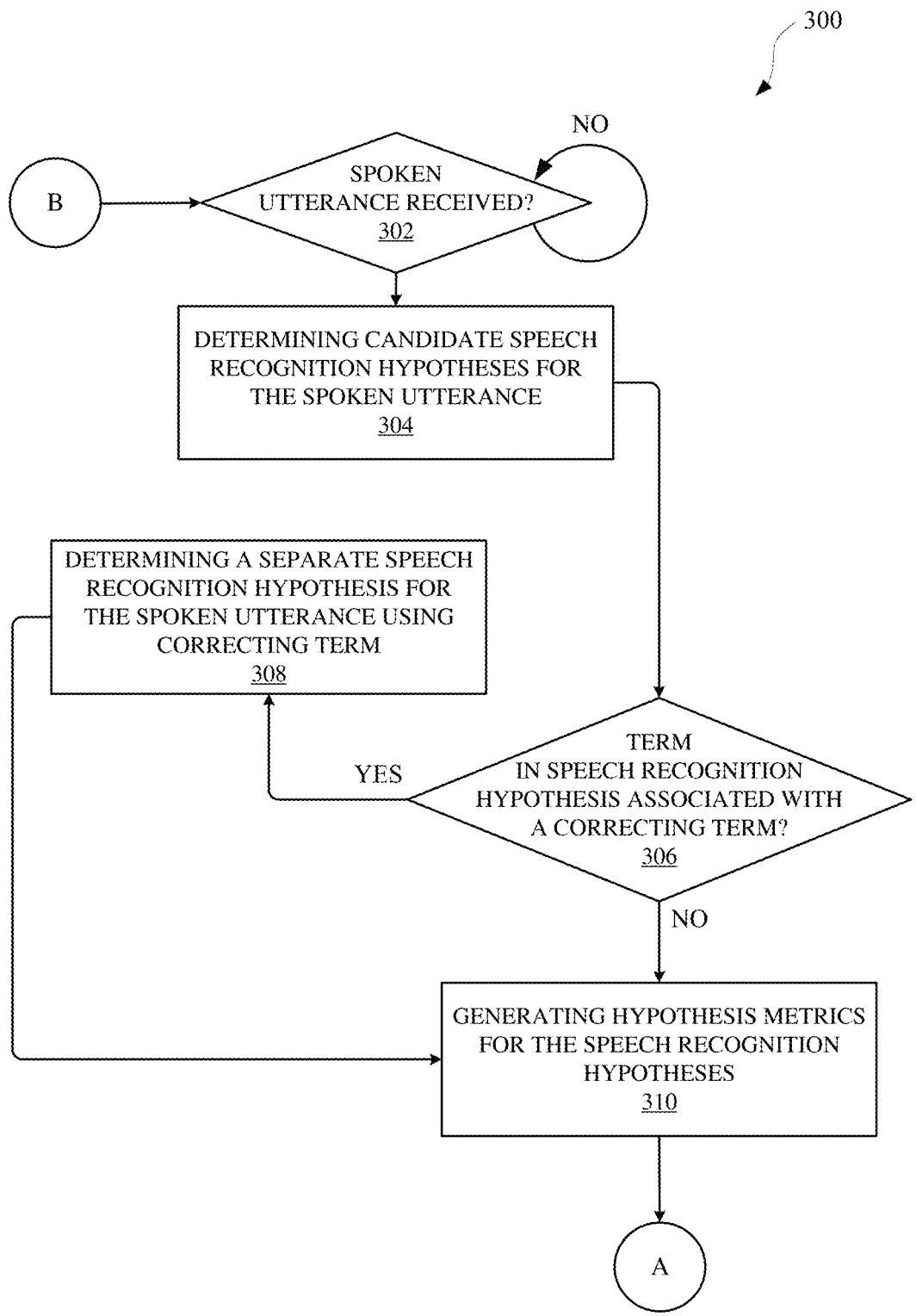
FIGS. 3A and 3B illustrate a method for modifying a speech recognition hypothesis for a spoken utterance from a user based on whether the any term within the speech recognition hypothesis had been previously corrected by the user in a similar context.
Figure 3B:
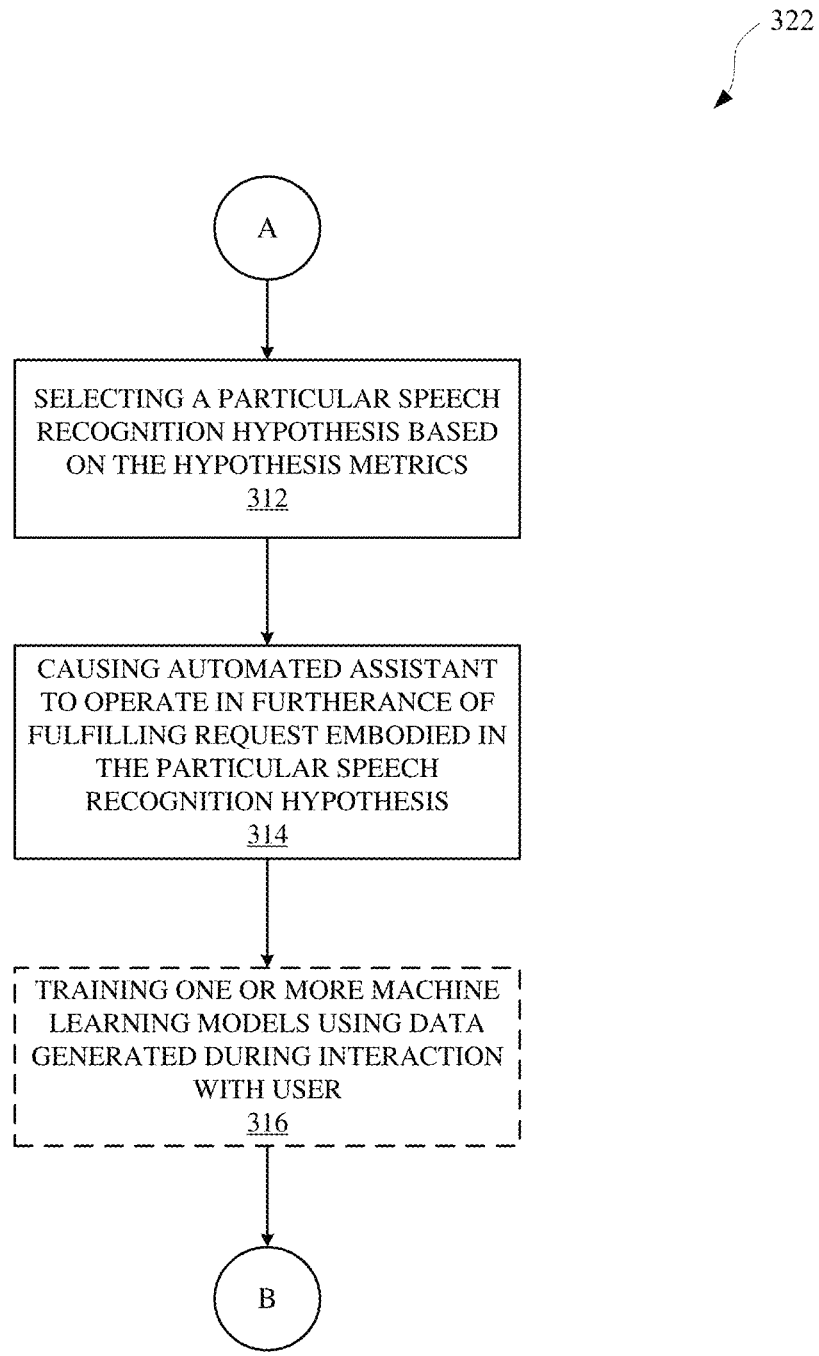

FIGS. 3A and 3B illustrate a method 300 for selecting a speech recognition hypothesis for a spoken utterance from a user based on whether the any term within the speech recognition hypothesis had been previously corrected by the user in a similar context and/or whether fulfillment data indicates the speech recognition hypothesis is suitable for fulfillment by the automated assistant. The method 300 can be performed by one or more computing devices, applications, and/or any other apparatus or module that can be associated with an automated assistant. The method 300 can include an operation 302 of determining whether a spoken utterance has been received by an application, which can be accessible via a computing device. The spoken utterance can be, for example, "Assistant, create an event entitled 'Zara birthday,'" which can be a request for an automated assistant to create a calendar event for a calendar application managed by the user. In response, the automated assistant can process audio data characterizing the spoken utterance to determine an accurate interpretation of the spoken utterance.

The method 300 can proceed from the operation 302 to an operation 304 of determining candidate speech recognition hypotheses for the spoken utterance. In some implementations, candidate speech recognition hypotheses can be generated using one or more heuristic processes and/or one or more trained machine learning models. For example, automatic speech recognition (ASR) can be utilized to generate each initial candidate hypothesis. The method 300 can proceed from the operation 304 to an operation 306, which can include determining whether a particular candidate hypothesis (e.g., "Create an event entitled 'Sarah's birthday.'") is associated with a correcting term. In other words, a determination can be made regarding whether any of the candidate hypotheses include a term (e.g., a portion of natural language content) that is associated with a correcting term. In some implementations, a correcting term can refer to a term that has been previously input by the user to correct the term found in any candidate hypothesis. For example, a user may have previously provided a different spoken utterance to an application that transcribed the spoken utterance and, subsequently, the user may have edited a transcription of the spoken utterance to include the correcting term. An association between the correcting term (e.g., "Zara") and another term (e.g., "Sarah") that was edited and/or replaced by the correcting term can be identified and stored in association with the automated assistant and/or the user. Thereafter, the automated assistant and/or other application (with prior permission from the user) can store data characterizing this association for subsequent reference, such as when a particular hypothesis term is determined to be associated with a correcting term.

When no term in the speech recognition hypothesis is determined to be associated with a correcting term, the method 300 can proceed from the operation 306 to an operation 310 of generating hypothesis metrics for the speech recognition hypotheses (including any speech recognition hypothesis that was generated to include a correcting term). Otherwise, when a speech recognition hypothesis (e.g., "Create an event entitled 'Sarah's birthday.'") includes a term (e.g., "Sarah") that is associated with a correcting term (e.g., "Zara"), the method 300 can proceed from the operation 306 to an operation 308 of determining a separate speech recognition hypothesis (e.g., "Create an event entitled 'Zara's birthday.'") for the spoken utterance using the correcting term. In order words, one or more terms of the candidate speech recognition hypothesis can be edited and/or replaced using one or more correcting terms that may be associated with the one or more terms and/or a candidate speech recognition hypothesis. The method 300 can then proceed from the operation 308 to the operation 310 for determining a separate hypothesis metric for the separate speech recognition hypothesis (e.g., a second hypothesis metric). In some implementations, the separate hypothesis metric can be determined by processing the separate speech recognition hypothesis using one or more heuristic processes and/or one or more trained machine learning models (e.g., a boosted random forest model). In some implementations, the method 300 can proceed from the operation 306 to the operation 308 exclusively based on there being an association identified between a term in a candidate hypothesis and a correcting term. In other words, other considerations, such as a context of the user and/or other hypotheses, may not be considered when determining the separate speech recognition hypothesis—except for determining the association between a term in the hypothesis and the correcting term. Alternatively, in some implementations, method 300 may proceed to the operation 306 only when a metric indicates a lack of confidence for one or more candidate hypotheses. In other words, when a particular candidate hypothesis is determined with a particular degree of confidence (e.g., a confidence metric that satisfies a threshold value), the operation 306 can be bypassed, and the method 300 can proceed to the operation 310.

When each speech recognition hypothesis associated with a corrected term has been utilized to create a separate respective speech recognition hypothesis, the method 300 can proceed from the operation 306 to an operation 310. The operation 310 can include generating hypothesis metrics for each speech recognition hypothesis of the speech recognition hypotheses. Each respective metric (i.e., each hypothesis metric) can estimate a probability and/or confidence that each respective hypothesis accurately describes the spoken utterance and/or request intended by the user. In some implementations, each candidate hypothesis can be generated with a respective hypothesis metric and/or each candidate hypothesis can be subsequently processed, optionally with other data, to determine each respective hypothesis metric. For example, contextual data (e.g., location data, event data, correspondence data, and/or any other user-permitted data) can be processed to determine a probability that a particular hypothesis accurately conveys the provided spoken utterance. For example, a particular metric for a particular hypothesis can be generated differently based on whether the user is away from their home compared to when they are at or near their home. In some implementations, processing of a candidate hypothesis can be performed using a boosted random forest model, which can employ decision tree classifiers that complement each other. In some implementations, each metric can be compared to a misrecognition threshold, before generating fulfillment data, for determining whether a particular candidate hypothesis does not accurately describe a spoken utterance. Thereafter, any hypothesis having a metric that satisfies, or does not satisfy, the misrecognition hypothesis may not be further considered as a candidate. In some implementations, each metric can be generated according to a user that is providing the spoken utterance, a context of the user, a device that the user is accessing, an application that the user is accessing, and/or any other feature of an interaction between the user and an application. For example, in some implementations each metric can be biased according to one or more features of an interaction between the user and their automated assistant.

In some implementations, fulfillment data can be utilized as a basis for generating each metric for each respective speech recognition hypothesis. A particular instance of fulfillment data can be generated based on content of a particular speech recognition hypothesis and/or a context in which the user provided the spoken utterance. The fulfillment data can indicate a degree to which the automated assistant is capable of fulfilling any request embodied in the particular speech recognition hypothesis and/or whether the automated assistant is able to fulfill any request embodied in the particular speech recognition hypothesis. For example, one or more intents and/or more slot values can be determined by processing the particular speech recognition hypothesis using one or more heuristic processes and/or one or more trained machine learning models. In some implementations, a metric for a speech recognition hypothesis can be based on whether the intent(s) and/or slot value(s) (or other portion of fulfillment data) identified for the speech recognition hypothesis are actionable and/or a degree to which they are estimated to be relevant to the user and/or a context of the user.

The method 300 can proceed from the operation 310, via continuation element "A" of FIG. 3A and FIG. 3B, to an operation 312 of FIG. 3B. The operation 312 can include selecting a particular speech recognition hypothesis based on the hypothesis metrics generated for the speech recognition hypotheses. The speech recognition hypotheses being considered can include those that were separately generated to include a correcting term at the operation 308. In some implementations, a metric that is prioritized over other metrics can be selected, and a particular speech recognition hypothesis corresponding to that selected metric can be further acted upon at the operation 314. In some implementations, when two or more metrics have a different that is less than a particular threshold value (e.g., a biasing threshold), one or more of the two or more metrics can be biased. One or more of the metrics can be selected for biasing based on, but not limited to, whether the metric corresponds to a speech recognition hypothesis that was generated from ASR and/or was not corrected with a correcting term. For example, a speech recognition hypothesis with an initial metric of 0.5 can be biased by 0.1 to result in a final metric of 0.6, which in some instances may indicate that the speech recognition hypothesis should be prioritized over any other hypothesis.

The method 300 can proceed from the operation 312 to an operation 314, which can include causing the automated assistant to operate in furtherance of fulfilling the request(s) embodied in the particular speech recognition hypothesis (e.g., the speech recognition hypothesis corresponding to the most prioritized and/or highest metric). In some implementations, none of the candidate hypothesis may correspond to a metric that satisfies, or does not satisfy, a particular threshold, and as a result, the user may be solicited (with prior permission from the user) to provide additional clarifying input for correcting a speech recognition hypothesis. For example, the automated assistant can cause one or more particular speech recognition hypotheses to be rendered at a display interface of a computing device for the user to view. The user can be solicited to edit one or more of the speech recognition hypotheses, and, thereafter, indicate that a corrected speech recognition hypothesis is suitable for the automated assistant to process further.

Alternatively, or additionally, the method 300 can proceed to an optional operation 316 that includes training one or more machine learning models using data generated during the interaction with the user. For example, when the user is solicited to provide correcting input, data characterizing either the correcting input and/or the term to be corrected can be utilized to train one or more trained machine learning models. In some implementations, a model (e.g., a misrecognition model) that is trained can include a boosted random forest model. In some implementations, data characterizing a pair of terms that include a hypothesis term and a correcting term can be stored in association with the user until one or more models are adequately trained to no longer need to reference the pair of associated terms. For example, when a particular pair of associated terms (e.g., "Sarah" and "Zara") are not referenced during speech processing for a threshold period of time (e.g., because speech processing has become more accurate), the particular pair of associated terms may no longer be stored in association with the user.

In some implementations, processing can be performed to determine whether an input provided, after an initial spoken utterance, to the automated assistant is a clarifying input and/or correcting input. In some implementations, this determination can be based on contextual data that is associated with a hypothesis generated through speech processing and/or associated with the user when, or before, providing the spoken utterance and/or the subsequent input. When the subsequent input is determined to be a correcting input, a hypothesis for the spoken utterance can be corrected and acted upon by a corresponding application. Additionally, training data can be generated to characterize the correcting input and the spoken utterance and/or hypothesis, thereby allowing one or more machine learning models to be trained according to the correction made by the user.

Figure 4:
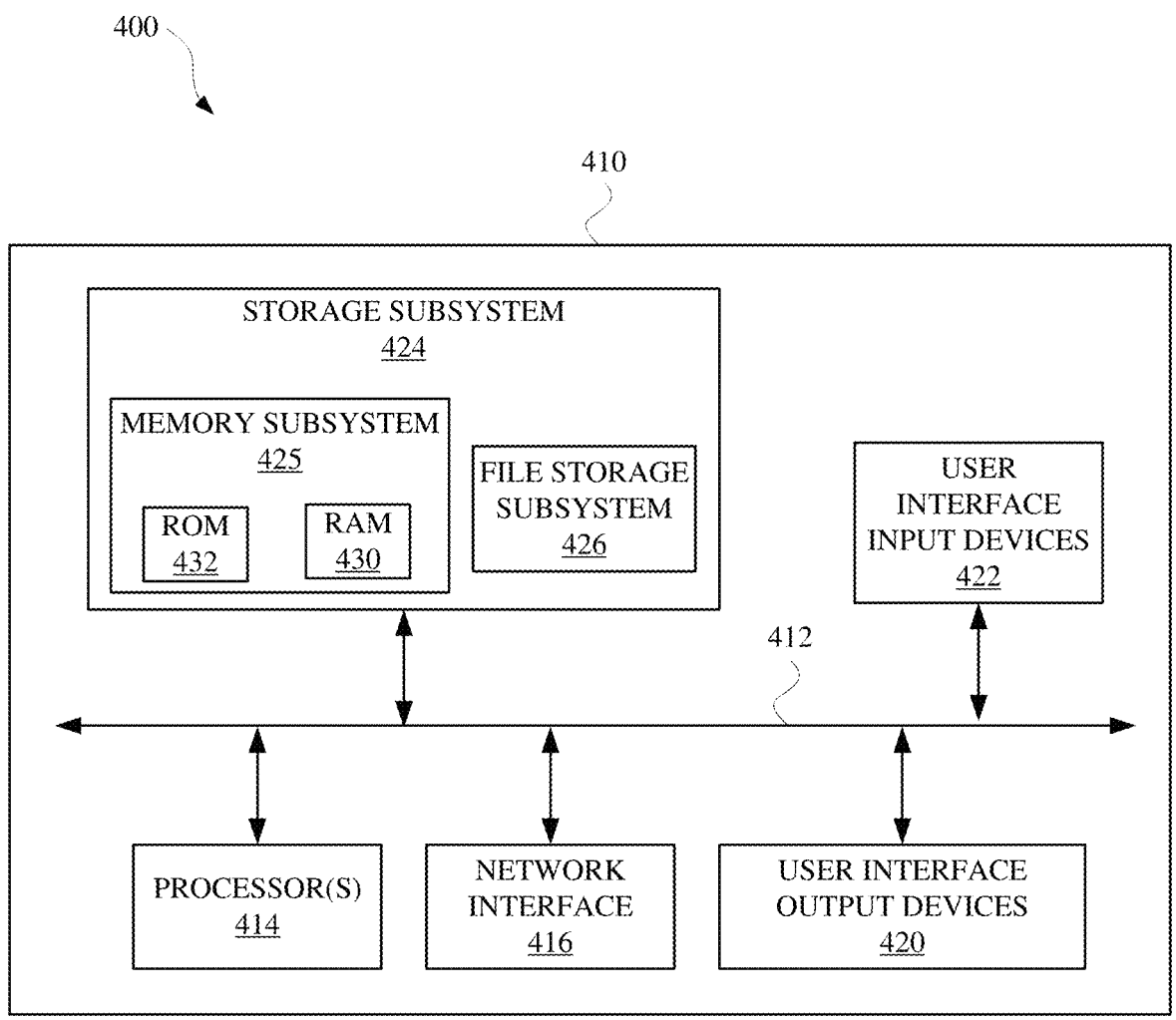
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, automated assistant, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as processing audio data that captures a spoken utterance provided by a user to an automated assistant that is accessible via a computing device, wherein the spoken utterance embodies a request to cause the automated assistant to perform one or more operations in furtherance of fulfilling the request. The method can further include generating, based on processing the audio data, speech recognition hypothesis data for the spoken utterance, wherein the speech recognition hypothesis data characterizes a speech recognition hypothesis and an alternate speech recognition hypothesis that are each a corresponding prediction of the spoken utterance, wherein the alternate speech recognition hypothesis includes one or more correcting terms that are not included in the speech recognition hypothesis, the speech recognition hypothesis includes one or more corrected terms that are not in the alternate speech recognition hypothesis, and wherein the one or more correcting terms are included, in the alternate speech recognition hypothesis in lieu of the corrected terms, based on one or more prior instance of correction of the one or more corrected terms to the one or more correcting terms. The method can further include determining, based on fulfillment data, whether to cause the automated assistant to respond to the speech recognition hypothesis or to instead respond to the alternate speech recognition hypothesis, wherein the fulfillment data indicates responsiveness of the automated assistant to the speech recognition hypothesis and/or to the alternate speech recognition hypothesis. The method can further include causing, based on the determining, the automated assistant to respond to either the speech recognition hypothesis or the alternate speech recognition hypothesis.

In some implementations, the fulfillment data includes hypothesis fulfillment data corresponding to the speech recognition hypothesis and includes alternate fulfillment data corresponding to the alternate speech recognition hypothesis, and determining whether to cause the automated assistant to respond to the speech recognition hypothesis or to instead respond to the alternate speech recognition hypothesis is based on the hypothesis fulfillment data and is based on the alternate fulfillment data. In some implementations, determining whether to cause the automated assistant to respond to the speech recognition hypothesis or to instead respond to the alternate speech recognition hypothesis includes: comparing the hypothesis fulfillment data to the alternate fulfillment data. In some implementations, the hypothesis fulfillment data indicates a first non-binary degree to which the automated assistant is predicted to be responsive to the speech recognition hypothesis, wherein the alternate fulfillment data indicates a second non-binary degree to which the automated assistant is predicted to be responsive to the alternate speech recognition hypothesis, and wherein comparing the hypothesis fulfillment data to the alternate fulfillment data includes: comparing the first non-binary degree to the second non-binary degree, while biasing toward determining to cause the automated assistant to respond to the speech recognition hypothesis in response to the speech recognition hypothesis being a primary hypothesis generated based on processing the audio data.

In some implementations, determining whether to cause the automated assistant to respond to the speech recognition hypothesis or to instead respond to the alternate speech recognition hypothesis includes: generating first output based on processing at least the hypothesis fulfillment data using a machine learning model; generating second output based on processing at least the alternate fulfillment data using the machine learning model; and determining, based on comparing the first output to the second output, whether to cause the automated assistant to respond to the speech recognition hypothesis or to instead respond to the alternate speech recognition hypothesis. In some implementations, comparing the first output to the second output comprises biasing toward the first output in response to the first output being for the speech recognition hypothesis and the speech recognition hypothesis being a primary hypothesis generated based on processing the audio data. In some implementations, generating the first output is further based on processing, using the machine learning model and along with the hypothesis fulfillment data, current contextual data, and wherein generating the second output is further based on processing, using the machine learning model and along with the alternate fulfillment data, the current contextual data.

In some implementations, the current contextual data includes a current location of the computing device and/or current temporal data. In some implementations, generating the first output is further based on processing, using the machine learning model and along with the hypothesis fulfillment data, one or more automatic speech recognition metrics generated during processing the audio data to generate the speech recognition hypothesis. In some implementations, generating the speech recognition hypothesis data comprises: processing the audio data using one or more automatic speech recognition models; determining the speech recognition hypothesis based on it being a hypothesis generated based on processing the audio data using the one or more automatic speech recognition models; determining, based on correction data associated with the computing device and/or the user, that the one or more corrected terms, of the speech recognition hypothesis, were previously corrected, during one or more prior interactions at the computing device and/or by the user, to the one or more correcting terms of the alternate speech recognition hypothesis; and based on determining that the one or more corrected terms were previously corrected to the one or more correcting terms: generating the alternate speech recognition hypothesis by replacing the one or more corrected terms with the one or more correcting terms.

In some implementations, the one or more prior interactions include a prior interaction in which the one or more correcting terms were manually entered, using a keyboard interface, and were manually entered as a replacement to the one or more corrected terms after display of the one or more corrected terms. In some implementations, the fulfillment data includes hypothesis fulfillment data that indicates responsiveness of the automated assistant to the speech recognition hypothesis, and wherein generating the alternate speech recognition hypothesis is further based on determining that the hypothesis fulfillment data fails to satisfy one or more criteria. In some implementations, determining, based on data associated with the computing device and/or the user, that the one or more corrected terms were previously corrected, during one or more prior interactions at the computing device and/or by the user, to the one or more correcting terms of the alternate speech recognition hypothesis, comprises: determining that current contextual data, when processing the audio data, matches prior contextual data of the one or more prior interactions; and wherein generating the alternate speech recognition hypothesis is further based on determining that the current contextual data matches the prior contextual data.

In other implementations, a method implemented by one or more processors is set forth as including operations such as causing a speech recognition hypothesis to be processed using one or more trained machine learning models, wherein the speech recognition hypothesis is a prediction of a spoken utterance provided by a user to an automated assistant that is accessible via a computing device. The method can further include determining, based on the speech recognition hypothesis being processed using the one or more trained machine learning models, that a hypothesis metric for the speech recognition hypothesis satisfies a misrecognition threshold. The method can further include determining, based on the hypothesis metric satisfying the misrecognition threshold, a separate speech recognition hypothesis, the separate speech recognition hypothesis includes one or more correcting terms that are not provided in the speech recognition hypothesis, and the speech recognition hypothesis includes one or more hypothesis terms that are not provided in the separate speech recognition hypothesis. The method can further include causing the separate speech recognition hypothesis to be processed using the one or more trained machine learning models, wherein the separate speech recognition hypothesis is a separate prediction of the spoken utterance provided by the user to the automated assistant. The method can further include determining, based on the separate speech recognition hypothesis being processed using the one or more trained machine learning models, that a separate hypothesis metric for the separate speech recognition hypothesis does not satisfy the misrecognition threshold or does not satisfy an alternate threshold. The method can further include causing, based on the separate hypothesis metric satisfying the misrecognition threshold, the automated assistant to initialize performance of one or more operations in furtherance of satisfying a request embodied in the separate speech recognition hypothesis.

In some implementations, the separate speech recognition hypothesis is further determined based on the one or more correcting terms being previously provided by the user to the automated assistant during a previous interaction between the user and the automated assistant. In some implementations, contextual data indicates that the previous interaction occurred in a prior context that included one or more features that are shared with a current context in which the user provided the spoken utterance, and causing the separate speech recognition hypothesis to be processed using the one or more trained machine learning models includes causing the contextual data to be processed using the one or more trained machine learning models and along with the separate speech recognition hypothesis. In some implementations, the one or more features include a location of the computing device in the prior context and the current context. In some implementations, the misrecognition threshold or the alternate threshold are dynamically adjusted based on one or more features of a context of the user.

In yet other implementations, a method implemented by one or more processors is set forth as including operations such as processing audio data capturing a spoken utterance provided by a user to an automated assistant that is accessible via a computing device, wherein the spoken utterance embodies a request to cause the automated assistant to perform one or more operations in furtherance of fulfilling the request, and wherein the audio data is processed in furtherance of generating a speech recognition hypothesis that is a prediction of the spoken utterance. The method can further include processing input data corresponding to an additional input provided by the user to the automated assistant subsequent to the user providing the spoken utterance to the automated assistant. The method can further include processing contextual data corresponding to a context of the user when the user provided the spoken utterance and the additional input to the automated assistant, wherein the contextual data is provided by the computing device, and/or a separate computing device that is associated with the automated assistant. The method can further include determining, based on the audio data, the input data, and the contextual data, a probability metric that indicates a degree to which the additional input is predicted to correct one or more hypothesis terms of the speech recognition hypothesis generated by the automated assistant. The method can further include, when the probability metric satisfies a misrecognition threshold: causing a separate speech recognition hypothesis to be determined for indicating the request to be fulfilled by the automated assistant, wherein the separate speech recognition hypothesis is a separate prediction of the spoken utterance.

The method can further include, when the probability metric satisfies the misrecognition threshold: causing a misrecognition model to be further trained using training data that is based on the audio data, input data, and/or the contextual data. In some implementations, the contextual data characterizes one or more features of a location of the user when the user provided the spoken utterance to the automated assistant. In some implementations, the additional input is a typed input at a keyboard interface of the computing device and/or the separate computing device. In some implementations, the additional input is a separate spoken utterance provided by the user to the computing device and/or the separate computing device.

We claim:

1. A method implemented by one or more processors, the method comprising:

processing audio data that captures a spoken utterance provided by a user to an automated assistant that is accessible via a computing device,
wherein the spoken utterance embodies a request to cause the automated assistant to perform one or more operations in furtherance of fulfilling the request;

generating, based on processing the audio data, speech recognition hypothesis data for the spoken utterance,
wherein the speech recognition hypothesis data characterizes a speech recognition hypothesis and an alternate speech recognition hypothesis that are each a corresponding prediction of the spoken utterance,
wherein the alternate speech recognition hypothesis includes one or more correcting terms that are not included in the speech recognition hypothesis, the speech recognition hypothesis includes one or more corrected terms that are not in the alternate speech recognition hypothesis, and
wherein the one or more correcting terms are included, in the alternate speech recognition hypothesis in lieu of the corrected terms, based on one or more prior instance of correction of the one or more corrected terms to the one or more correcting terms;

determining, based on fulfillment data, whether to cause the automated assistant to respond to the speech recognition hypothesis or to instead respond to the alternate speech recognition hypothesis,
wherein the fulfillment data indicates responsiveness of the automated assistant to the speech recognition hypothesis and/or to the alternate speech recognition hypothesis; and causing, based on the determining, the automated assistant to respond to either the speech recognition hypothesis or the alternate speech recognition hypothesis.

2. The method of claim 1,
wherein the fulfillment data includes hypothesis fulfillment data corresponding to the speech recognition hypothesis and includes alternate fulfillment data corresponding to the alternate speech recognition hypothesis, and wherein determining whether to cause the automated assistant to respond to the speech recognition hypothesis or to instead respond to the alternate speech recognition hypothesis is based on the hypothesis fulfillment data and is based on the alternate fulfillment data.

3. The method of claim 2, wherein determining whether to cause the automated assistant to respond to the speech recognition hypothesis or to instead respond to the alternate speech recognition hypothesis includes:

comparing the hypothesis fulfillment data to the alternate fulfillment data.

4. The method of claim 3, wherein the hypothesis fulfillment data indicates a first non-binary degree to which the automated assistant is predicted to be responsive to the speech recognition hypothesis, wherein the alternate fulfillment data indicates a second non-binary degree to which the automated assistant is predicted to be responsive to the alternate speech recognition hypothesis, and wherein comparing the hypothesis fulfillment data to the alternate fulfillment data includes:

comparing the first non-binary degree to the second non-binary degree, while biasing toward determining to cause the automated assistant to respond to the speech recognition hypothesis in response to the speech recognition hypothesis being a primary hypothesis generated based on processing the audio data.

5. The method of claim 2, wherein determining whether to cause the automated assistant to respond to the speech recognition hypothesis or to instead respond to the alternate speech recognition hypothesis includes:

generating first output based on processing at least the hypothesis fulfillment data using a machine learning model;

generating second output based on processing at least the alternate fulfillment data using the machine learning model; and determining, based on comparing the first output to the second output, whether to cause the automated assistant to respond to the speech recognition hypothesis or to instead respond to the alternate speech recognition hypothesis.

6. The method of claim 5, wherein comparing the first output to the second output comprises biasing toward the first output in response to the first output being for the speech recognition hypothesis and the speech recognition hypothesis being a primary hypothesis generated based on processing the audio data.

7. The method of claim 5, wherein generating the first output is further based on processing, using the machine learning model and along with the hypothesis fulfillment data, current contextual data, and wherein generating the second output is further based on processing, using the machine learning model and along with the alternate fulfillment data, the current contextual data.

8. The method of claim 7, wherein the current contextual data includes a current location of the computing device and/or current temporal data.

9. The method of claim 7, wherein generating the first output is further based on processing, using the machine learning model and along with the hypothesis fulfillment data, one or more automatic speech recognition metrics generated during processing the audio data to generate the speech recognition hypothesis.

10. The method of claim 1, wherein generating the speech recognition hypothesis data comprises:

processing the audio data using one or more automatic speech recognition models;

determining the speech recognition hypothesis based on it being a hypothesis generated based on processing the audio data using the one or more automatic speech recognition models;

determining, based on correction data associated with the computing device and/or the user, that the one or more corrected terms, of the speech recognition hypothesis, were previously corrected, during one or more prior interactions at the computing device and/or by the user, to the one or more correcting terms of the alternate speech recognition hypothesis; and based on determining that the one or more corrected terms were previously corrected to the one or more correcting terms:

generating the alternate speech recognition hypothesis by replacing the one or more corrected terms with the one or more correcting terms.

11. The method of claim 10, wherein the one or more prior interactions include a prior interaction in which the one or more correcting terms were manually entered, using a keyboard interface, and were manually entered as a replacement to the one or more corrected terms after display of the one or more corrected terms.

12. The method of claim 10, wherein the fulfillment data includes hypothesis fulfillment data that indicates responsiveness of the automated assistant to the speech recognition hypothesis, and wherein generating the alternate speech recognition hypothesis is further based on determining that the hypothesis fulfillment data fails to satisfy one or more criteria.

13. The method of claim 10, wherein determining, based on data associated with the computing device and/or the user, that the one or more corrected terms were previously corrected, during one or more prior interactions at the computing device and/or by the user, to the one or more correcting terms of the alternate speech recognition hypothesis, comprises:

determining that current contextual data, when processing the audio data, matches prior contextual data of the one or more prior interactions; and wherein generating the alternate speech recognition hypothesis is further based on determining that the current contextual data matches the prior contextual data.

14. A system comprising memory storing instructions and one or more processors operable to execute the instructions to:

process audio data that captures a spoken utterance provided by a user to an automated assistant, wherein the spoken utterance embodies a request to cause the automated assistant to perform one or more operations in furtherance of fulfilling the request;

generate, based on processing the audio data, speech recognition hypothesis data for the spoken utterance, wherein the speech recognition hypothesis data characterizes a speech recognition hypothesis and an alternate speech recognition hypothesis that are each a corresponding prediction of the spoken utterance, wherein the alternate speech recognition hypothesis includes one or more correcting terms that are not included in the speech recognition hypothesis, the speech recognition hypothesis includes one or more corrected terms that are not in the alternate speech recognition hypothesis, and wherein the one or more correcting terms are included, in the alternate speech recognition hypothesis in lieu of the corrected terms, based on one or more prior instance of correction of the one or more corrected terms to the one or more correcting terms;

determine, based on fulfillment data, whether to cause the automated assistant to respond to the speech recognition hypothesis or to instead respond to the alternate speech recognition hypothesis, wherein the fulfillment data indicates responsiveness of the automated assistant to the speech recognition hypothesis and/or to the alternate speech recognition hypothesis; and cause, based on the determining, the automated assistant to respond to either the speech recognition hypothesis or the alternate speech recognition hypothesis.

15. The system of claim 14, wherein the fulfillment data includes hypothesis fulfillment data corresponding to the speech recognition hypothesis and includes alternate fulfillment data corresponding to the alternate speech recognition hypothesis, and wherein determining whether to cause the automated assistant to respond to the speech recognition hypothesis or to instead respond to the alternate speech recognition hypothesis is based on the hypothesis fulfillment data and is based on the alternate fulfillment data.

16. The system of claim 15, wherein in determining whether to cause the automated assistant to respond to the speech recognition hypothesis or to instead respond to the alternate speech recognition hypothesis one or more of the processors are to:

compare the hypothesis fulfillment data to the alternate fulfillment data.

\* \* \* \* \*